June 6, 1939.　　　W. A. BARNES　　　2,161,446
CONSTRUCTION OF ELECTRICAL APPLIANCES
Filed Jan. 31, 1938

INVENTOR.
William A. Barnes.
BY Hoodling and Krost,
ATTORNEY.

Patented June 6, 1939

2,161,446

UNITED STATES PATENT OFFICE 2,161,446

CONSTRUCTION OF ELECTRICAL APPLIANCES

William A. Barnes, Mansfield, Ohio, assignor to Dominion Electrical Manufacturing Company Application January 31, 1938, Serial No. 187,882

3 Claims. (Cl. 219—19)

My invention relates in general to electrical appliances and more particularly to the hinge construction which pivotally connects the two parts of an appliance, such, for example, as a sandwich toaster or a waffle iron together.

In the construction of waffle irons or sandwich toasters or other similar electrical appliances, there are two parts hinged together by relatively long hinges, so that the top part may be raised and swung over in an open position. In the swinging of the top part to its open position, the hinges are subjected to severe abuse, because the top part is usually quite heavy and if it is not carefully handled, it is apt to be swung over with a jar. The damaging effect from the jar is magnified for the reason that the hinges are usually quite long and therefore produce an unusually large amount of strain at the point of connection with the casing of the appliance. Thus, it is common to observe that the hinges in use heretofore upon appliances have readily become loose after a short period of time.

Therefore an object of my invention is an improved hinge construction and mounting which will withstand heavy abuse.

Another object of my invention is the provision of an improved hinged construction which is simple in construction and will withstand an extraordinary amount of strain and abuse.

Another object of my invention is the provision of hinges having obscured or hidden fastening means.

Another object of my invention is the provision of hinges having flat and straight members without bends, so that they may be made of hard steel stampings.

Another object of my invention is the provision of hinges having no bends, so that the entire surface may be polished.

Another object of my invention is the provision of hinges having hidden portions which need not be polished and which may be the portion held when the exposed portion is polished.

Other objects and a fuller understanding of my invention may be had by referring to the following description and claims taken in conjunction with the accompanying drawing, in which:

Figure 1:
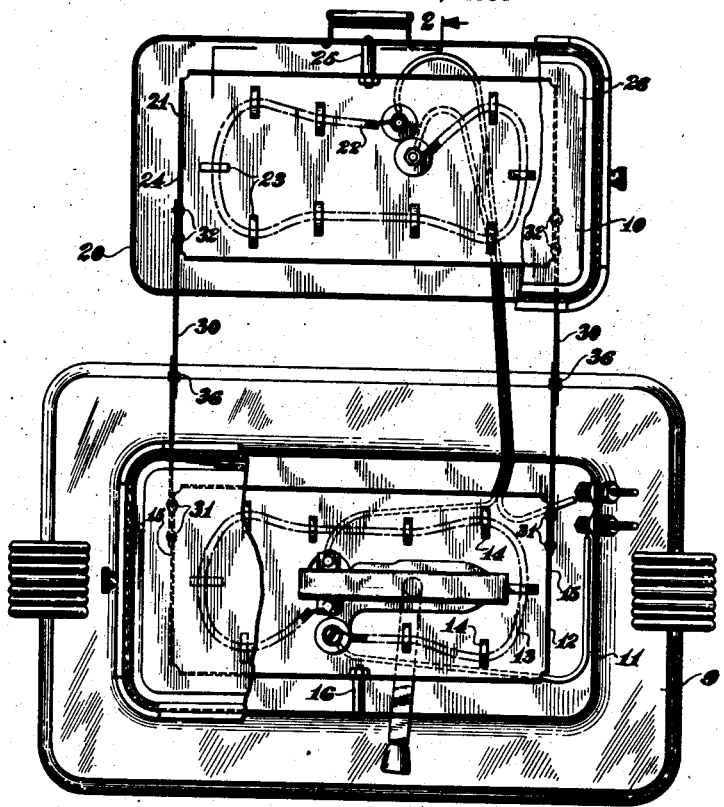
Figure 1 is a view of an appliance embodying the features of my invention, with portions cut away to show parts of my invention.
Figure 2:
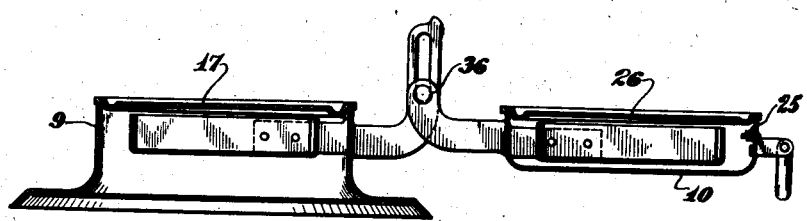
Figure 2 is a cross-sectional view of the appliance in Figure 1 taken along the line 2—2 thereof.

With reference to the drawing, the electrical appliance which may be in the form of a sandwich toaster or a waffle iron comprises a lower part indicated generally by the reference character 9 having a casing 11 and an upper part indicated generally by the reference character 10 having a casing 20. Mounted within the lower casing 11 is a supporting member 12 carrying insulating brackets 14 around which a heating element 13 may be mounted. In accordance with usual practice a grill plate 17 may be provided on the top surface of the casing 12.

The upper casing 20 may be provided with a similarly constructed supporting member 21 carrying insulating brackets 23 around which a heating element 22 may be mounted. The upper part 10 may be provided with a grill plate 26.

The lower part 9 and the upper part 10 may be suitably hinged together by a pair of hinges 30. The end portion of the hinges connected to the lower part 9 pass through openings in the wall of the casing 11 and extend over to and are fastened to up-turned side walls 15 of the supporting member 12 by means of rivets 31 or any other suitable means. Similarly, the end portion of the hinges 30 connected to the upper part 10 pass through openings in the wall of the casing 20 and extend over to and are fastened to up-turned side walls 24 of the supporting member 21 by means of rivets 32 or any other suitable means.

Figure 3:
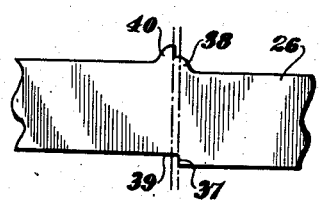
Figure 3 is an enlarged fragmentary view of a portion of the hinge where it passes through a casing of the appliance.

The places where the hinges pass through the openings in the casing 11 and 20 respectively, are offset as shown in Figure 3, and the heel portion 37 and the raised portion 40 restrain the hinges against longitudinal movement. Thus, the supporting member 12 may be held in position with reference to the lower casing 11 by means of the offset hinge construction and a securing device 16 which may comprise a tube through which a screw extends having a nut threadably engaging the end of the screw and holding the marginal wall 15 between the nut and tube.

Figure 4:
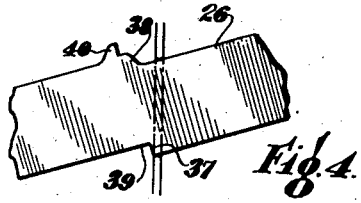
Figure 4 is a view similar to Figure 3 showing the manner in which a portion of the hinge is inserted through an opening of the casing of the appliance.

The supporting member 21 may be held in position in the upper casing 20 by means of the offset hinge construction and a securing device 25 which may comprise a tube through which a screw extends having a nut threadably engaging the end thereof and holding the marginal wall 24 between the nut and the tube. The external hinge connections 36 are made after the supporting members 12 and 21 are mounted in the casings 11 and 20. In mounting the supporting members, the hinged parts which are riveted thereto are first inserted through the openings in the wall of the casing. When the offset portions engage the openings in the casing, the hinge parts are positioned at an angle such as shown in Figure 4 until the heel 37 clears the opposite side of the casing, after which the supporting member is moved in substantially a horizontal plane which causes the raised stepped portion 38 to fit under the top edge of the opening in the casing, while at the same time, the depressed edge 39 drops in engagement with the lower edge of the opening, as shown in Figure 3. Next, the securing devices 16 and 25 are assembled which securely holds the supporting members and the hinges in a fixed position. Then, the external hinge connections 36 are mounted to hold the lower part 9 and upper part 10 pivotally together.

The construction as illustrated is very simple in construction and will withstand a great deal of strain without the hinges working loose, because of the long lever arm construction of mounting the hinges to the lower and upper parts of the appliance, produced by the distance from one side of the casing where the hinges pass therethrough to the other side of the casing where the supporting members are connected thereto.

The hinges may be made of flat and straight members without bends, as is found in the prior art where the hinges were connected to the casing of the appliance. In view of the fact that my hinges are flat and straight, they may be made of hard steel stampings, since they do not have to be bent as was heretofore in general practice. Therefore, my improved hinges are very much stronger than hinges heretofore in use. Furthermore, my hinges are such that they do not have any exposed rivets or other fastening means for connecting them to the outside surface of the casing of the appliance. The elimination of the rivets and other fastening means improves the appearance of the appliance. Another benefit is present in my invention in that the hinges need not be bent so that the entire surface may be polished to give a good finish. In the polishing of bent hinges heretofore used in the art, great difficulty was experienced in polishing the surface on the inside of the angle formed by the bent portions of the hinges, with the result that the polish was not uniform. In the polishing of my hinges, the hidden portions within the casing need not be polished and for that reason the polishing man may grasp the end portions which are to be mounted inside of the casing and thereby enable him to hold the hinges in a secured manner while polishing the exposed portions which are on the outside of the casing.

Although I have described my invention with a certain degree of particularity, it is understood that the present disclosure has been made only by way of example and that numerous changes in the details of construction and the combination and arrangement of parts may be resorted to without departing from the spirit and the scope of the invention as hereinafter claimed.

I claim as my invention:

1. In an appliance having hinged parts, in combination, a casing for each part, supporting means inside said casing and hinging means attached to said supporting means for hinging said parts together, said hinging means extending through said casings and pivotally engaging each other and permitting movement of one casing with respect to the other, said hinging means having integral shoulders on either side of said casing which prevent lateral movement of said hinging means and said supporting means, said hinging means at the place of passing through the casing being substantially fixed with respect to said casing.

2. In an electrical cooking apparatus having a first casing part with a second casing part hinged thereto, in combination, electrical heating elements in said casings, a supporting member in each casing for the heating element, first arm means extending through said first casing and attached to said first supporting member, second arm means extending through said second casing and attached to said second supporting member, off-set means on said arm means preventing lateral movement between said arm means and said casings, a slotted portion in one of said arm means to allow movement of one of said casing parts with respect to the other, and pivot means through said arm means.

3. In an electrical cooking apparatus having hinged casing parts, in combination, an electrical heating element in each casing, a supporting member in each casing for the heating element, and hinging means for hinging the casing parts together, said hinging means extending through the casing wall and having at its top and bottom edges on either side of said casing wall off-set means to prevent movement by the hinging means relative to the said casing and to provide a support for the said heating element supporting means.

WILLIAM A. BARNES.